Sept. 27, 1966  W. A. HINDS  3,275,824
PORTABLE LAMP
Filed Dec. 3, 1963  2 Sheets-Sheet 1

INVENTOR.
William A. Hinds
BY
Frease, Bishop, Johns & Schick
ATTORNEYS

Sept. 27, 1966     W. A. HINDS     3,275,824
PORTABLE LAMP
Filed Dec. 3, 1963     2 Sheets-Sheet 2
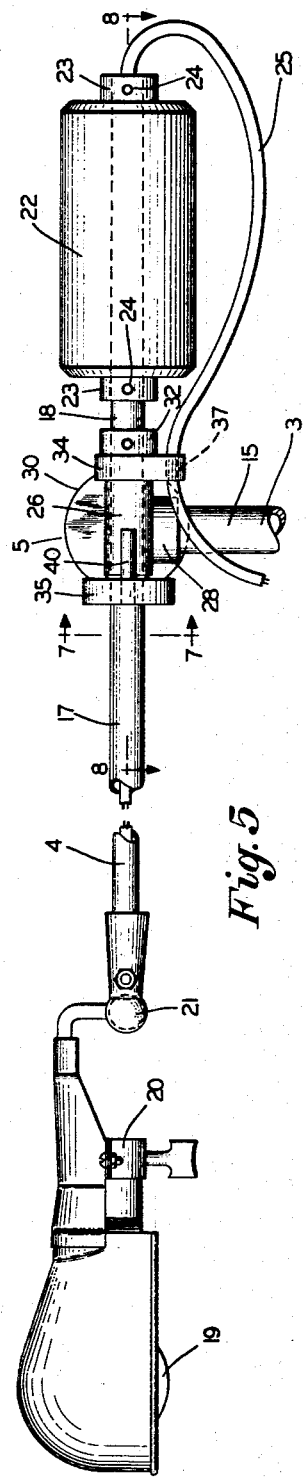
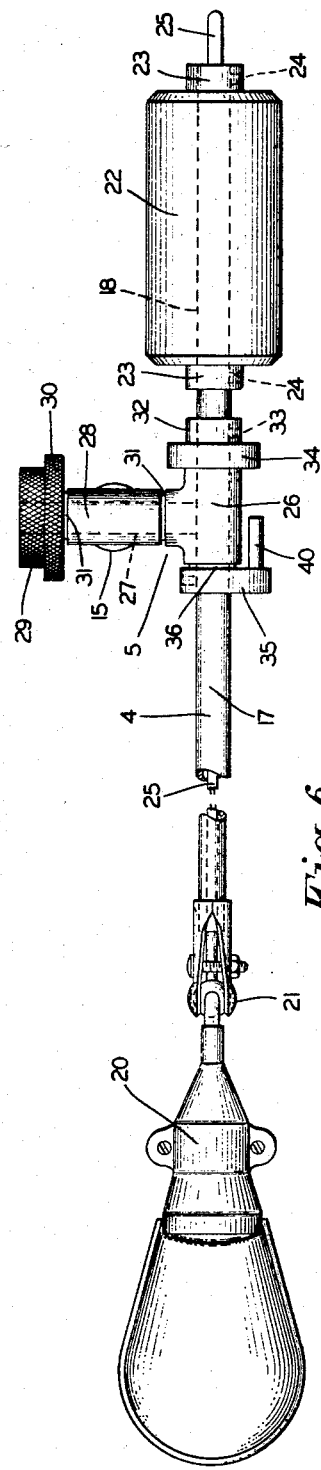
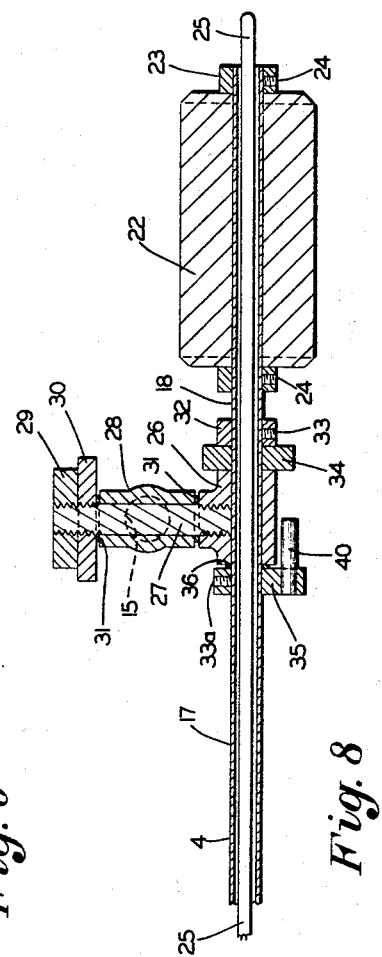
INVENTOR.
*William A. Hinds*
BY
*Frease, Bishop, Johns & Schick*
ATTORNEYS

United States Patent Office 3,275,824
Patented Sept. 27, 1966

3,275,824
PORTABLE LAMP
William A. Hinds, 126 Cherry St., New Philadelphia, Ohio
Filed Dec. 3, 1963, Ser. No. 327,632
3 Claims. (Cl. 240—81)

This invention relates to a portable lamp, and more particularly it pertains to a movable lamp for use by automobile repairmen and the like.

In the past, portable lamps of various types have been used for providing local work areas with light. Most of such lamps have been satisfactory because convenient facilities have been provided for attaching and maintaining the lamp in place, such as at work benches.

It frequently happens, however, with some types of work that means for securing and maintaining adequate light at the desired location is simply not provided. As a result, much time and effort is wasted because of the lack of adequate lighting.

Automobile repairmen are particularly plagued by the lack of adequate light while doing intricate repair work under automobile hoods. Not only is light frequently necessary under the hood but it is also required for under an automobile, particularly in the hoisted or "jacked-up" position.

It has been found that the device of the present invention has alleviated the problem of providing adequate lighting for circumstances where local lighting for repairmen is not otherwise available. The device of the present invention provides a lamp attached to the outer end of an elongated arm, which in turn is pivotally and rotatably mounted at the upper end of a vertical standard.

The lower end of the standard in turn is mounted on a base having casters, which base has a weight of from 10–30 pounds for preventing tipping. The arm has a counter-weight on the end opposite that of the light so that the light may be set and maintained in any desired position.

The standard is provided in two separable sections, the lower section of which is shorter than the upper section so that the elongated arm with the counter-balanced lamp may be attached to the upper end of the lower section to expedite use of the lamp under an automobile. Finally, for storing in a minimum of space, the lamp is readily movable to the vertical position so that it is entirely disposed above the base and covers a minimum of floor area.

Accordingly, it is a general object of the present invention to provide a portable lamp which is particularly adapted for use by automobile repairmen.

It is another object of this invention to provide a portable lamp which may be placed and maintained in the desired position where no means are otherwise provided for maintaining the lamp in said position.

It is another object of the invention ot provide a portable lamp which is mounted on one end of an elongated counter-balanced extension which is pivotally mounted at the upper end of a tilt-proof base.

It is another object of this invention to provide a portable lamp including a vertical standard separable into higher and lower lengths for mounting the lamp extension arm and in either upper or lower positions.

Finally, it is an object of this invention to provide an improved portable lamp which eliminates the difficulties enumerated and obtains the foregoing desiderata in an effective manner.

These and other objects and advantages apparent to those skilled in the art from the following description and claims may be obtained, the stated results achieved and described difficulties overcome by the discoveries, principles, apparatus, parts, combinations, subcombinations and elements which comprise the present invention, the nature of which is set forth in the following statement, a preferred embodiment of which—illustrative of the best mode in which applicant has contemplated applying the principles—is set forth in the following description, and which is particularly and distinctly pointed out and set forth in the appended claims forming part hereof.

The nature of the discoveries and improvements of the present invention may be stated in general terms as including a portable lamp construction having a weighted base mounted on casters, an upright standard secured to the base, an arm on the upper end of the standard, means pivotally mounting the arm on the standard, the arm having aligned portions extending on opposite sides of the pivot means, a lamp at the end of one arm portion, a counterbalance on the other arm portion, the arm portion having the lamp being rotatable about its axis, the standard having at least two separable portions, the pivotal means being detachably connectable to the upper end of each standard portion, and an electrical outlet means mounted on the base.

In the drawings:

FIG. 5 is an enlarged elevational view of the arm at the upper end of the standard;

FIG. 6 is a plan view of the device shown in FIG. 5;

FIG. 8 is a horizontal sectional view taken on the line 8—8 of FIG. 5.

Similar numerals refer to similar parts throughout the several views of the drawings.

Figure 1:
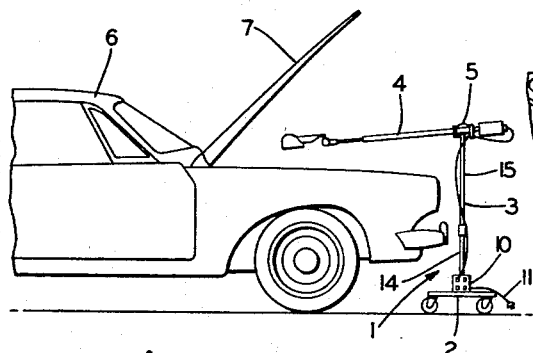
FIGURE 1 is a diagrammatic view showing the manner in which a portable lamp may be used over the engine of an automobile.
Figure 2:
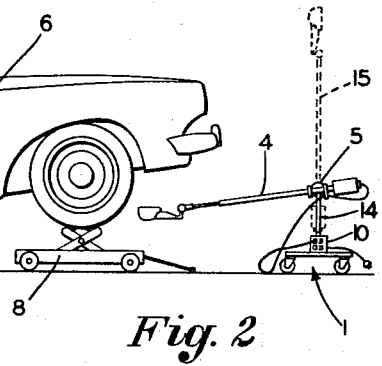
FIG. 2 is a diagrammatic view showing the manner in which a portable lamp may be used under an automobile, and showing (in broken lines) an upper storage position.

A portable lamp generally indicated at 1 in FIG. 1 includes a base 2, a standard 3, an arm 4, and means 5 for pivoting the arm at the upper end of the standard. In FIG. 1, the lamp 1 is shown in use over the motor of an automobile 6 having an upraised hood 7. In FIG. 2, the lamp 1 is shown in an alternate position for use under the automobile 6 when the automobile is mounted on a hoist or jack 8.

Figure 4:
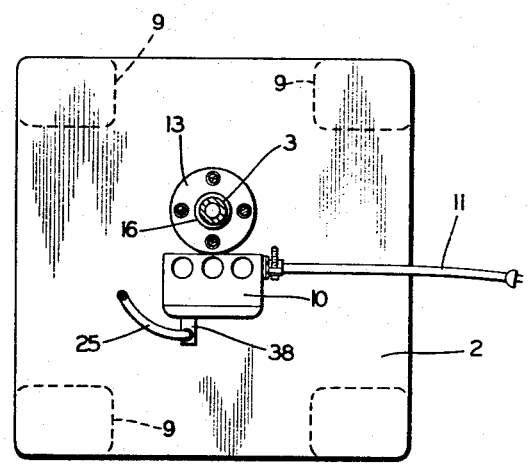
FIG. 4 is a plan view of the lamp base.
Figure 3:
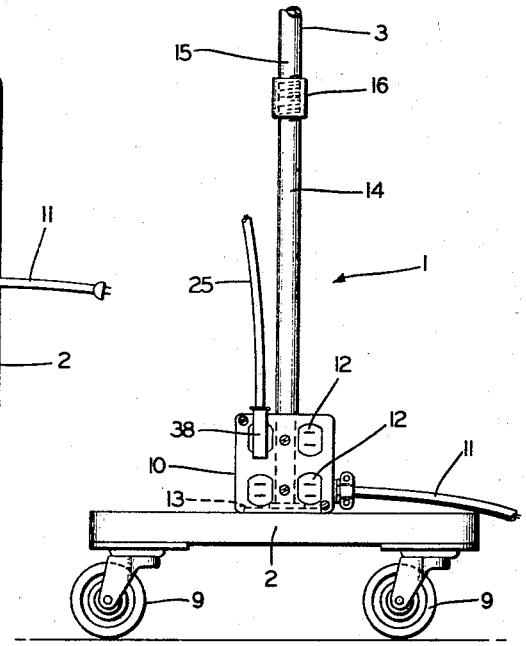
FIG. 3 is an enlarged elevational view of the base and lower portion of the standard.

In FIGS. 3 and 4, the base 2 is provided with preferably four casters 9. The base may be composed of metal or wood and has a weight preferably of from 10 to 30 pounds. By providing a heavy base 2, the lamp 1 remains stable at all times and free from the normal forces causing tipping, such as when the arm 4 is disposed in the substantially horizontal position shown in FIG. 1.

An electrical outlet box 10 is preferably mounted on the base which box is provided with a cord 11 for attachment to a conventional electrical outlet in a building wall. A plurality of outlet sockets 12 are provided in the box 10 for the convenience of a workman using the lamp 1 as well as other electrically operated power tools.

The standard 3 is attached to the base 2 at the lower end by means of a flanged connector 13 which is fixedly secured at the lower end of the standard 3. The standard 3 is secured slightly off center of the base 2 so that the arm 4, mounted on one side of the standard is disposed directly above the center of the base. The standard 3 may be composed of a single upright member such as a metal pipe. However, it is preferably composed of two separable portions including a lower portion 14 and an upper portion 15 which portions are secured together by a threaded coupling 16. In that manner, the lamp may be used at a higher position, as shown in FIG. 1, for directing light downwardly upon a workpiece. Or the upper portion 15 with the coupling 16 may be disconnected and the lamp mounted at the upper end of the lower portion 14 for directing light upwardly upon a workpiece, as shown in FIG. 2.

The arm 4 is an elongated tube, shown more particularly in FIGS. 5, 6, and 8, and has portions 17 and 18 extending on an aligned axis and on opposite sides of the upper end of the arm portion 15. An electrical lamp 19 having a conventional socket and hood unit 20 is pivotally attached at 21 to the outer end of the arm portion 17. A counterweight 22 is fixedly secured on the arm portion 18 by means of similar securing rings 23 having set screws 24 extending into the outer surface of the arm portion 18.

As shown in the drawings, the arm portions 17 and 18 are preferably integral portions of the arm 4 which is preferably a metal pipe through which an electrical cord 25 extends from the lamp 19 and out of the opposite end at the right of the arm, as viewed in FIG. 5.

In FIG. 8, the arm is rotatably mounted in a pipe T 26 which in turn is mounted on a threaded end of a shaft 27 that is rotatably mounted in a pipe T 28. The opposite end of the shaft 27 is threaded for the mounting of a pair of knurled centrally threaded members 29 and 30 for tightening the assembly in place at the upper end of the shaft when desired. For that purpose, a lock washer 31 is provided on the shaft 27 at opposite ends of the T 28, such as between the T's 26 and 28 and between the T 28 and the member 30. Accordingly, the pivot means 5 includes the T's 26 and 28 as well as the shaft 27, and the arm 4 may be placed at any desired angle of inclination about the axis of rotation of the shaft.

To prevent longitudinal movement of the arm 4 in the T 26, a ring 32 having a set screw 33 is mounted on the arm portion 18 adjacent to a flange-like member 34 which member is an integral part of the T 26. On the other side of the T 26, another member 35 having a set screw 33a is provided on the arm portion 17. A lock washer 36 is provided between the T 26 and the member 35. Accordingly, the arm 4 is rotatably mounted within the T 26 and the members 34 and 35 prevent longitudinal movement.

As shown in FIG. 5, the member 34 has an aperture 37. The electrical cord 25 extends through the aperture and is thereby held close to the standard 3. In FIG. 3, the lower end of the cord is provided with a plug 38 for attachment to one of the outlet sockets 12.

Figure 7:
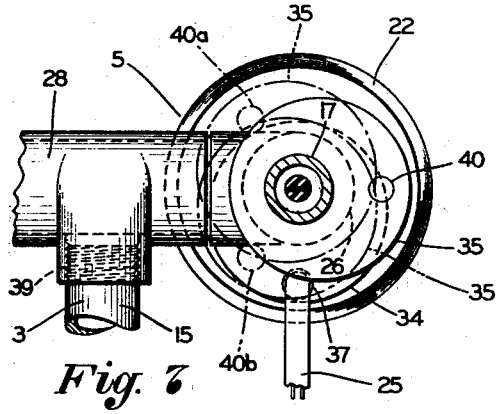
FIG. 7 is an enlarged fragmentary vertical sectional view taken on the line 7—7 of FIG. 5.

As shown in FIG. 7, the T 28 is threaded at 39 and attached to the upper end of the upper standard portion 15. Although the arm 4 is rotatably mounted in the T 26, it is prevented from complete rotation through 360° by a pin 40 (FIGS. 5, 6, and 8) one end of which is seated in an aperture in the ring 34 and which extends in a direction parallel the axis of rotation of the arm 4. When the arm is rotated in the T 26, the pin 40 turns between points of contact above and below the T 26 as shown at pin positions 40a and 40b in FIG. 7. In that manner, the cord 26 is not twisted unduly and thereby damaged.

When the arm 4 is used in the lower position of FIG. 2, the upper standard portion 15 is disconnected from the lower portion 14 by removing the coupling 16 from said lower portion to expose the upper threaded end portion of said lower portion. In addition, the upper threaded end portion 39 (FIG. 7) is disconnected from the T 28 and is attached to the upper threaded end portion of the lower standard portion 14. Thus, the lamp may be used in any position normally convenient for a workman.

When the lamp is not in use, it may be stored with the arm disposed in a vertical position as shown in the dotted position of the arm in FIG. 2.

The device of the present invention provides a portable lamp which has an ideal length and height for use with workmen, such as automobile mechanics. The lamp may be used in many positions and has a vertical storage position, the latter of which occupies a minimum of floor area. The primary advantage of the lamp is that it saves time and stays where it is placed, thereby overcoming the disadvantages of prior mechanics' lamps which either had to be manually held or laid in the nearest convenient place. As a result, the device of the present invention has satisfied a great need by workmen.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A portable lamp including a weighted base mounted on castors, an upright standard with one end secured on the base, an arm on the upper end of the standard, means pivotally mounting the arm on the standard, the arm having portions on opposite sides of said mounting means, a lamp at the end of one arm portion, a counterbalance on the other arm portion, the mounting means including a first T detachably mounted on the upper end of the standard which T has a horizontal bore, said means also including a shaft rotatably mounted in the first T, a second T secured to one end of the shaft and having a bore extending at right angles to the shaft, the arm extending through the bore of the second T and being rotatable therein, said means also including a block means on the arm for preventing longitudinal movement of the arm in the second T, and pin means on the block means and extending on a line parallel to the axis of the arm and being movable between positions of contact on opposite sides of the second T for preventing rotation of the arm through 360°.

2. The construction of claim 1 in which the upright standard is composed of at least two separable portions including upper and lower portions, and in which the first T is detachably connectable with the upper end of each standard portion.

3. A portable lamp including a weighted base mounted on castors, an upright standard with one end secured on the base, an arm on the upper arm of the standard, means pivotally mounting the arm on the standard, the arm having portions on opposite sides of said mounting means, a lamp at the end of one arm portion, a counterbalance on the other arm portion, the mounting means including first T means detachably mounted on the upper end of the standard which T means has a horizontal bore and a vertical bore engaged with the standard, said mounting means also including a shaft rotatably mounted in the horizontal bore of the first T means, a second T secured to one end of the shaft and having a bore extending at right angles to the shaft, the arm extending through the bore of the second T and being rotatable therein, and said mounting means also including rings on the arm engaging the second T at the ends of the second T bore for preventing longitudinal movement of the arm in the second T.

References Cited by the Examiner
UNITED STATES PATENTS 2,012,284  8/1935  Nirdlinger _____ 240—81 X
2,171,028  8/1939  Gelb _____ 240—1.3 X
2,459,722  1/1949  Price _____ 240—81

FOREIGN PATENTS 1,325,836  3/1963  France.

NORTON ANSHER, *Primary Examiner.*
CHARLES C. LOGAN, *Assistant Examiner.*